(12) United States Patent
Wu et al.

(10) Patent No.: US 12,275,080 B2
(45) Date of Patent: Apr. 15, 2025

(54) TAPPING APPARATUS WITH A THREAD CHECKING MECHANISM

(71) Applicant: Jabil Circuit (Singapore) Pte. Ltd., Singapore (SG)

(72) Inventors: Jiang-Xi Wu, Wuxi (CN); Ming Zhao, Wuxi (CN); Bi Meng, Wuxi (CN); Zhan-Qiang Chen, Wuxi (CN); Shao-Bo Pan, Wuxi (CN); Chuan-Ying Chien, Wuxi (CN)

(73) Assignee: Jabil Circuit (Singapore) Pte. Ltd., Singapore (SG)

( * ) Notice: Subject to any disclaimer, the term of this patent is extended or adjusted under 35 U.S.C. 154(b) by 489 days.

(21) Appl. No.: 17/896,384

(22) Filed: Aug. 26, 2022

(65) Prior Publication Data

US 2023/0095272 A1    Mar. 30, 2023

(30) Foreign Application Priority Data

Sep. 24, 2021   (CN) .................. 202122324731.X

(51) Int. Cl.
*B23G 1/48*    (2006.01)
*B23G 1/46*    (2006.01)
*B23Q 17/20*   (2006.01)

(52) U.S. Cl.
CPC .............. *B23G 1/48* (2013.01); *B23G 1/46* (2013.01); *B23Q 17/20* (2013.01)

(58) Field of Classification Search
CPC ... B23G 1/00; B23G 1/46; B23G 1/48; B23G 1/20; B23G 1/44
See application file for complete search history.

(56) References Cited

U.S. PATENT DOCUMENTS

| | | | | |
|---|---|---|---|---|
| 3,611,463 A | * | 10/1971 | Schirtzinger et al. | B23G 1/16 470/96 |
| 4,753,555 A | * | 6/1988 | Thompson | B23B 47/28 408/1 R |
| 2014/0241820 A1 | * | 8/2014 | Berg | B23B 49/00 901/44 |

FOREIGN PATENT DOCUMENTS

| | | | |
|---|---|---|---|
| CN | 206455251 U | | 9/2017 |
| CN | 109304525 A | * | 2/2019 |
| CN | 210548632 U | | 5/2020 |
| CN | 111360338 A | * | 7/2020 |
| CN | 212350681 U | | 1/2021 |
| KR | 20120034325 A | * | 4/2012 |

\* cited by examiner

*Primary Examiner* — Jared O Brown
(74) *Attorney, Agent, or Firm* — Young Basile Hanlon & MacFarlane, P.C.

(57) ABSTRACT

A tapping apparatus adapted for tapping a workpiece includes a lower die unit to drive the workpiece to move along a conveying direction, and an upper die unit disposed above and movable upwardly and downwardly relative to the lower die unit. A tapping mechanism is disposed between the lower and upper die units to be driven by the upper die unit for tapping the workpiece so that the workpiece is formed with a tapped hole. A thread checking mechanism is disposed between the lower and upper die units and is spaced apart from the tapping mechanism along the conveying direction. The thread checking mechanism is driven by the upper die unit for checking the tapped hole of the workpiece.

18 Claims, 5 Drawing Sheets

TAPPING APPARATUS WITH A THREAD CHECKING MECHANISM

CROSS-REFERENCE TO RELATED APPLICATION

This application claims priority to Chinese Patent Application No. 202122324731. X, filed on Sep. 24, 2021.

FIELD

The disclosure relates to a tapping apparatus, and more particularly to a tapping apparatus with a thread checking mechanism.

BACKGROUND

In general, when a tapping apparatus taps a workpiece, defects may occur on the tapped workpiece. Currently, the tapped workpiece is checked manually or checked by a detection device. However, manual check still has the risk of missing detection and causes high labor costs. Although the detection device can avoid the risk of missing detection, the check efficiency of the detection device is relatively low. That is to say, when defects are found on a product, there have been many defective products having the same defects, and the defective products cannot be thrown away instantly. Besides, some products after being tapped are too complicated in structure to be checked. Therefore, there is still room for improvement.

SUMMARY

Therefore, an object of the disclosure is to provide a tapping apparatus that can alleviate at least one of the drawbacks of the prior art.

According to the disclosure, a tapping apparatus is adapted for tapping a workpiece and includes a lower die unit, an upper die unit, a tapping mechanism, and a thread checking mechanism.

The lower die unit is configured to drive the workpiece to move along a conveying direction.

The upper die unit is disposed above and movable upwardly and downwardly relative to the lower die unit.

The tapping mechanism is disposed between the lower and upper die units and is adapted to be driven by the upper die unit for tapping the workpiece so that the workpiece is formed with a tapped hole.

The thread checking mechanism is disposed between the lower and upper die units and is spaced apart from the tapping mechanism along the conveying direction. The thread checking mechanism is driven by the upper die unit for checking the tapped hole of the workpiece.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
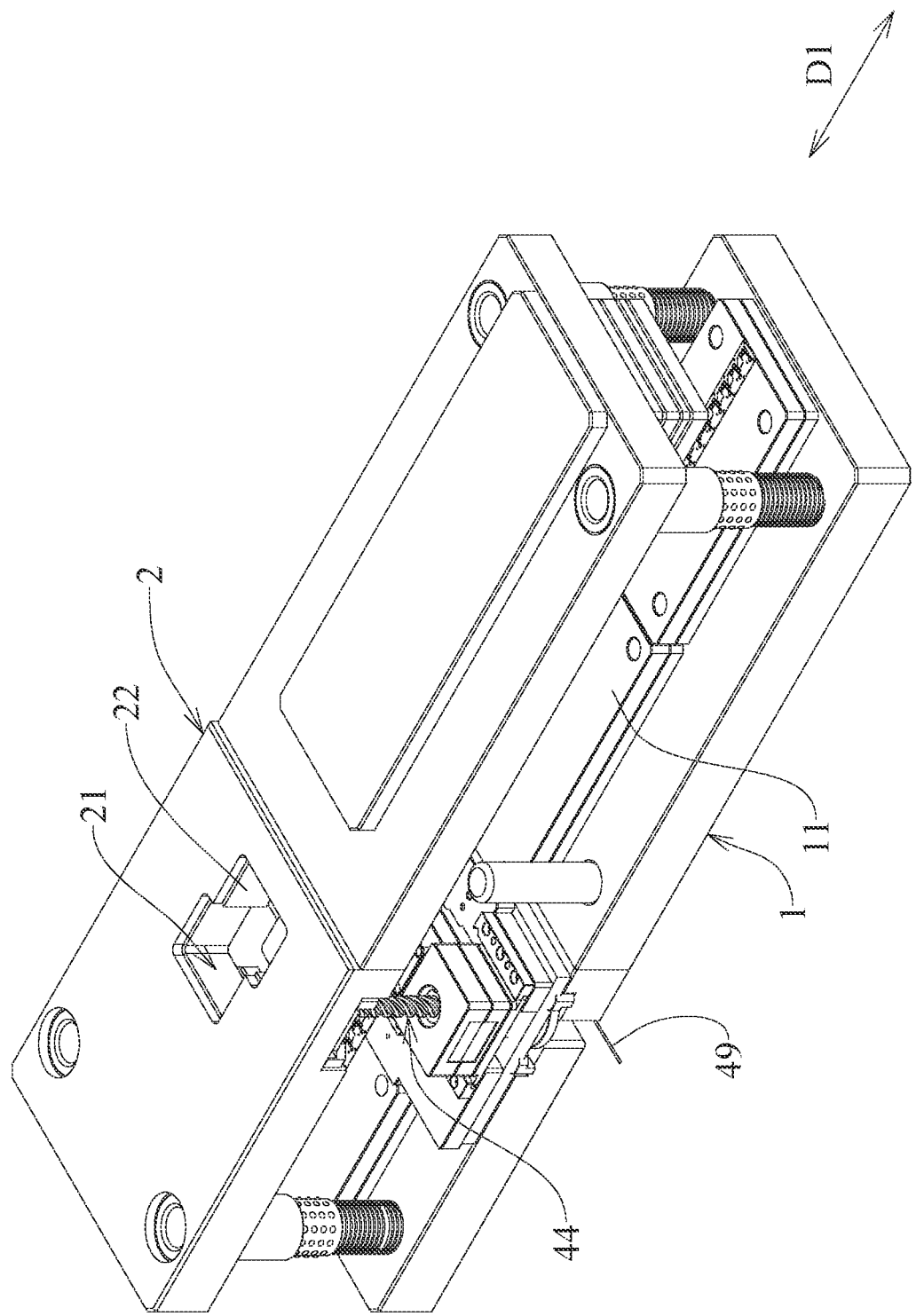
FIG. 1 is a perspective view illustrating a tapping apparatus according to an embodiment of the disclosure.
Figure 2:
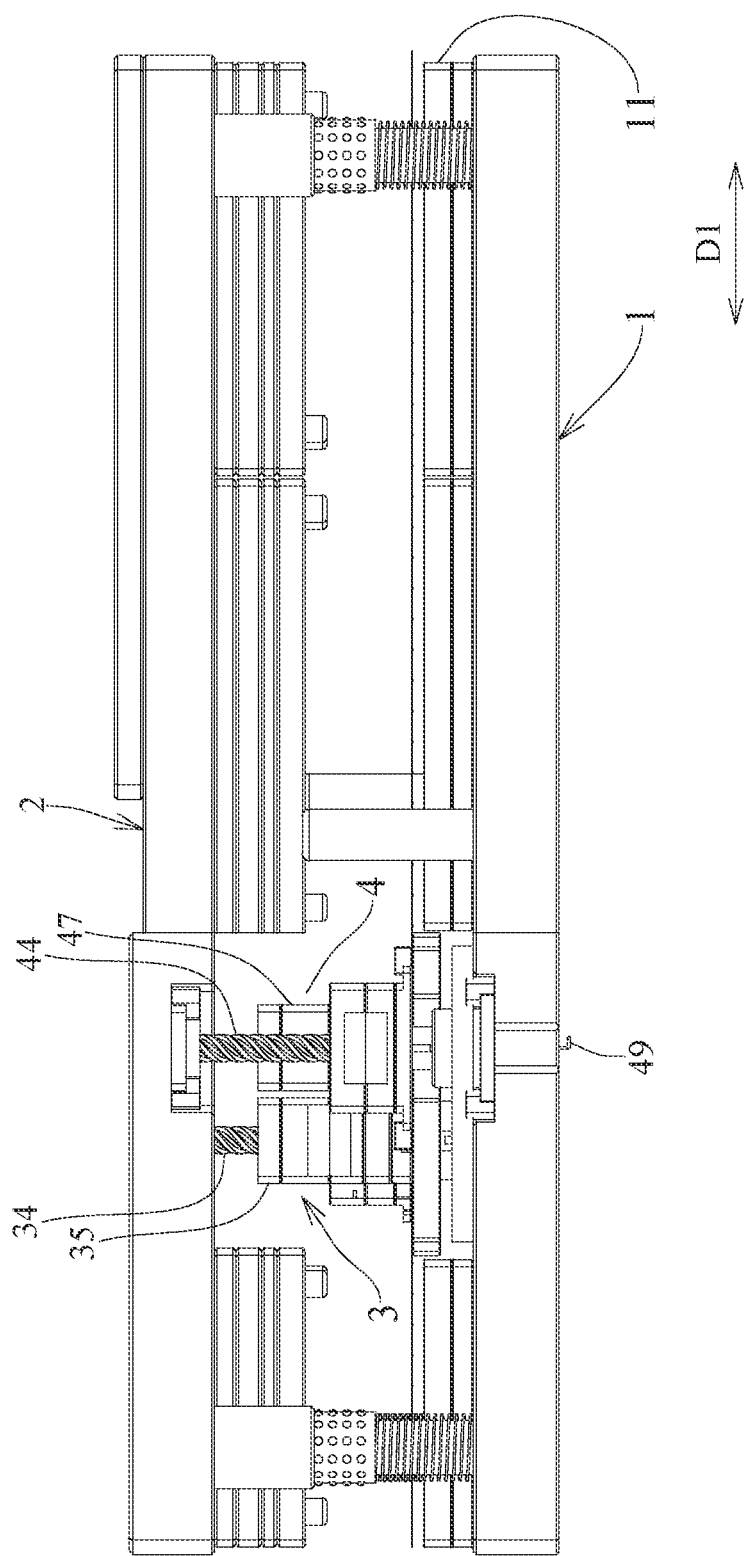
FIG. 2 is a side view of the embodiment.
Figure 3:
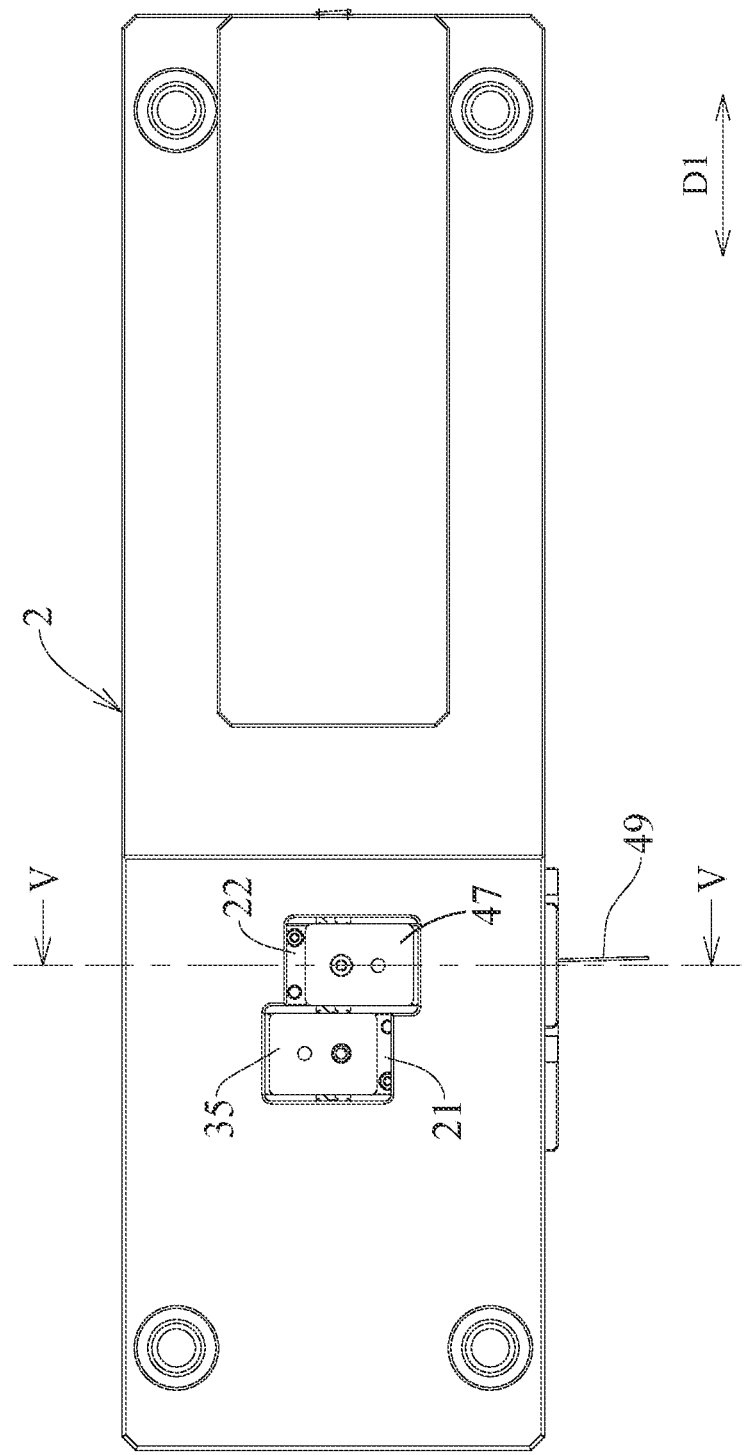
FIG. 3 is a top view of the embodiment.

Referring to FIGS. 1 to 3, a tapping apparatus according to an embodiment of the disclosure is adapted for tapping a workpiece. The tapping apparatus includes a lower die unit 1, an upper die unit 2, a tapping mechanism 3, and a thread checking mechanism 4.

The lower die unit 1 is generally in the form of a plate elongated along a conveying direction (D1) and has a conveyor table 11 capable of driving the workpiece to move along the conveying direction (D1).

The upper die unit 2 is disposed above and movable upwardly and downwardly relative to the lower die unit 1. The upper die unit 2 has a thread forming opening 21 and a thread checking opening 22. The thread forming opening 21 and the thread checking opening 22 are spatially in communication with each other and are situated directly above the tapping mechanism 3 and the thread checking mechanism 4, respectively.

Figure 4:
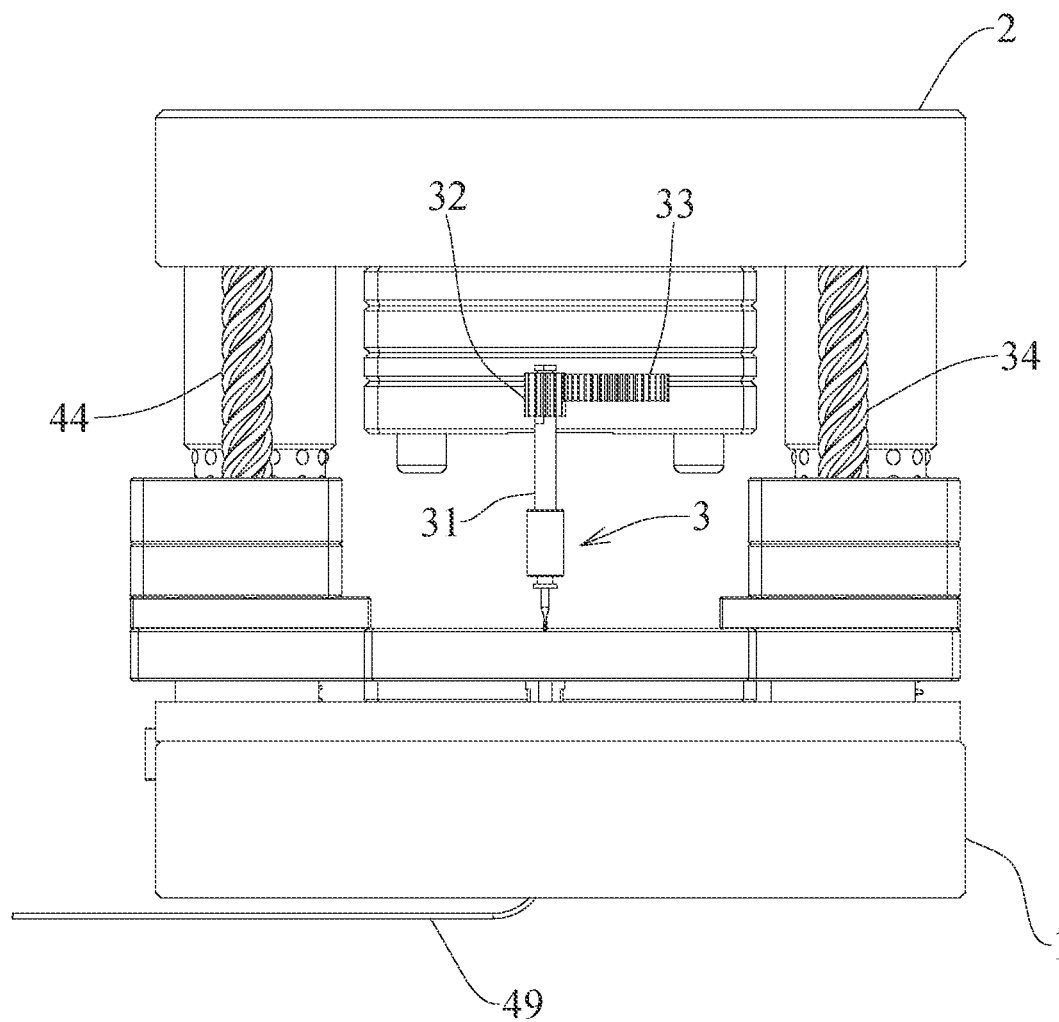
FIG. 4 is a front view of the embodiment, in which a thread forming protective casing of a tapping mechanism is omitted.

Referring to FIG. 4 in combination with FIGS. 1 and 3, the tapping mechanism 3 is disposed between the lower and upper die units 1, 2 and is driven by the upper die unit 2 for tapping the workpiece so that the workpiece is formed with a tapped hole. The tapping mechanism 3 includes a thread forming tap 31, a thread forming transmission gear 32, a thread forming drive gear 33, a thread forming drive rod 34, and a thread forming protective casing 35. The thread forming tap 31 is movable upwardly and downwardly relative to the lower die unit 1. The thread forming transmission gear 32 is fixed on the thread forming tap 31. The thread forming drive gear 33 is meshed with the thread forming transmission gear 32. The thread forming drive rod 34 is disposed between the upper and lower die units 1, 2. The thread forming protective casing 35 is disposed on the lower die unit 1. The thread forming drive rod 34 is driven and rotated by the upper die unit 2. In this embodiment, the thread forming drive rod 34 is meshed with a spiral gear (not shown) in a known manner. When the upper die unit 2 drives the thread forming drive rod 34 to rotate, the thread forming drive rod 34 drives rotation of the thread forming transmission gear 32 to rotate the thread forming drive gear 33 so as to drive upward and downward movements of the thread forming tap 31 for tapping the workpiece. The thread forming protective casing 35 accommodates the thread forming tap 31, the thread forming transmission gear 32, and the thread forming drive gear 33. The thread forming opening 21 of the upper die unit 2 is situated directly above the thread forming protective casing 35. When the upper die unit 2 moves downwardly toward the lower die unit 1, the thread forming protective casing 35 moves into the thread forming opening 21.

Figure 5:
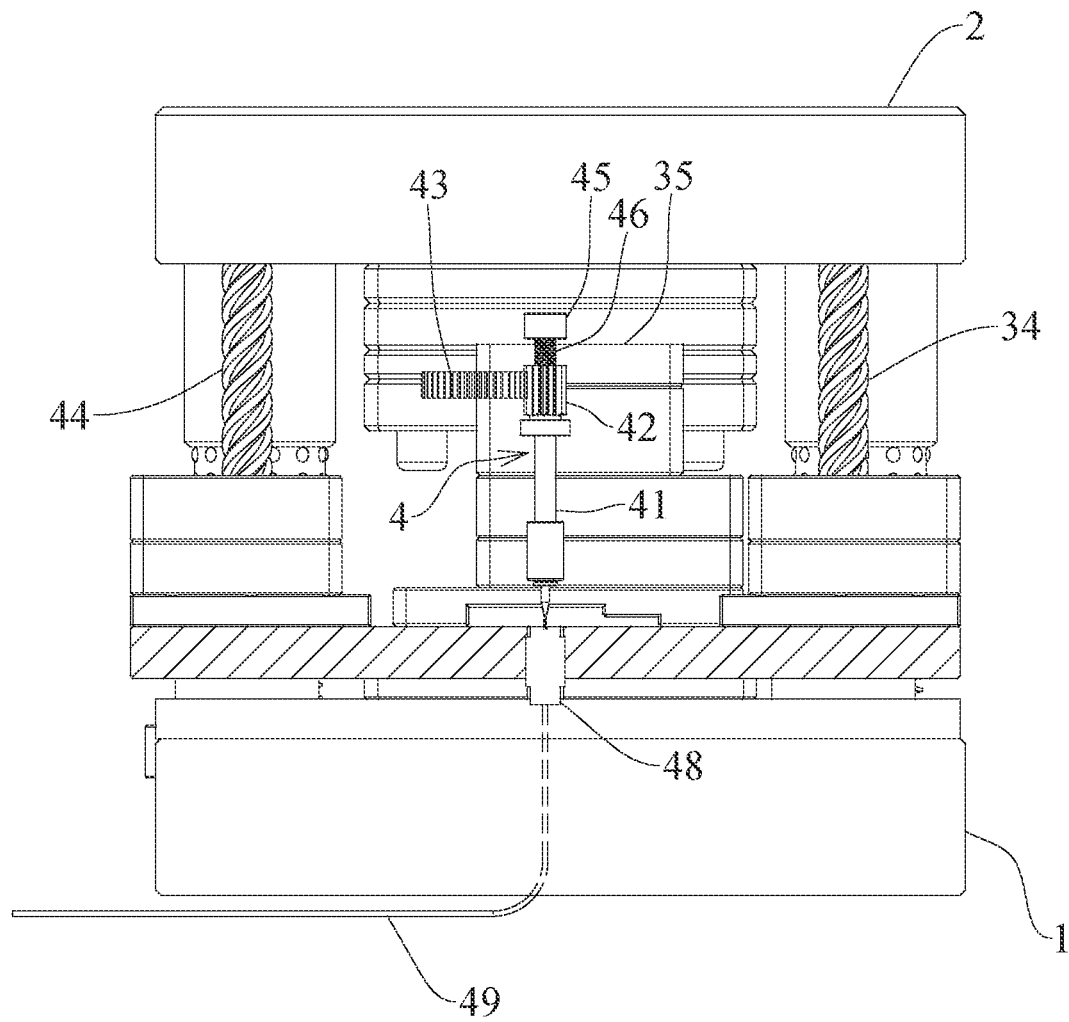
FIG. 5 is a sectional view taken along line V-V of FIG. 3.

Referring to FIG. 5 in combination with FIGS. 1 to 3, the thread checking mechanism 4 is disposed between the lower and upper die units 1, 2, and is spaced apart from the tapping mechanism 3 along the conveying direction (D1). The thread checking mechanism 4 is driven by the upper die unit 2 for checking the tapped hole of the workpiece. The thread checking mechanism 4 includes a thread plug gauge 41, a thread checking transmission gear 42, a thread checking drive gear 43, a thread checking drive rod 44, an adjuster 45, a resilient member 46, a thread checking protective casing 47, an insulation supporter 48, and a sensor 49. The thread plug gauge 41 is movable upwardly and downwardly relative to the lower die unit 1. The thread checking transmission gear 42 is fixed on the thread plug gauge 41. The thread checking drive gear 43 is meshed with the thread checking transmission gear 42. The thread checking drive rod 44 is disposed between the upper and lower die units 1, 2. The adjuster 45 is disposed on the thread plug gauge 41 and is movable upwardly and downwardly relative to the thread plug gauge 41. The resilient member 46 is sleeved on the thread plug gauge 41 and has two ends respectively abutting against the adjuster 45 and the thread checking transmission gear 42. The thread checking protective casing 47 is disposed on the lower die unit 1. The insulation supporter 48 is disposed on the lower die unit 1 and below the thread plug gauge 41. The sensor 49 is connected to the insulation supporter 48. The thread checking drive rod 44 is driven and rotated by the upper die unit 2, and is operable for driving upward and downward movements of the thread plug gauge 41. In this embodiment, the thread checking drive rod 44 is meshed with a spiral gear (not shown) in a known manner. When the upper die unit 2 drives rotation of the thread checking drive rod 44, the thread checking drive rod 44 is operable for rotating the thread checking drive gear 43 so as to drive upward and downward movements of the thread plug gauge 41, thereby checking the tapped hole of the workpiece. The adjuster 45 is adjustably screwed to an upper end of the thread plug gauge 41. A change in a distance between the adjuster 45 and the thread checking transmission gear 42 can adjust the compressibility of the resilient member 46, thereby adjusting the sensitivity of the thread plug gauge 41 for stopping the thread plug gauge 41 when engaging a defectively tapped screw hole. The thread checking protective casing 47 protectively, accommodates the thread plug gauge 41, the thread checking transmission gear 42, and the thread checking drive gear 43. The thread checking opening 22 of the upper die unit 2 is situated directly above the thread checking protective casing 47. When the upper die unit 2 moves downwardly toward the lower die unit 1, the thread checking protective casing 47 moves into the thread checking opening 22.

During use of the tapping apparatus of the disclosure, when the upper die unit 2 moves downwardly toward the lower die unit 1, the thread checking drive rod 44 is driven and rotated by the upper die unit 2 and is operable for driving the rotation of the thread checking drive gear 43, thereby driving the upward and downward movements of the thread plug gauge 41 to check the tapped hole of the workpiece. When checking, the thread plug gauge 41 moves downwardly into the tapped hole of the workpiece. If the tapped hole is normal, the thread plug gauge 41 passes smoothly through the tapped hole and contacts with the sensor 49, and the sensor 49 reports that there is no check abnormality. In this case, the tapping apparatus continues to operate. At this time, because the thread plug gauge 41 and the sensor 49 are in a conductive state, the insulation supporter 48 provides insulation protection when the thread plug gauge 41 contacts the sensor 49. If the tapped hole is defective, the thread plug gauge 41 is unable to pass smoothly through the defective tapper hole to contact with the sensor 49. After a predetermined time, the sensor 49 reports that there is a check abnormality, so that operation of the tapping apparatus is instantly stopped for ensuring that no more abnormal tapped workpieces would be fabricated. Besides, a user can inspect whether the thread forming tap 31 of the tapping mechanism 3 is damaged and needs to be replaced. In this embodiment, the tapping mechanism 3 and the thread checking mechanism 4 are mounted on the lower die unit 1 and are activated through the thread forming drive rod 34 and the thread checking drive rod 44. However, in other embodiments, the tapping mechanism 3 and the thread checking mechanism 4 are mounted on the upper die unit 2, and are simultaneously moved downwardly together with the upper die unit 2 to respectively tap the workpiece and check the tapped hole of the workpiece.

In summary, because the thread checking mechanism 4 and the tapping mechanism 3 are driven by the upper die unit 2, after the workpiece is formed with the tapped hole by the tapping mechanism 3, the thread checking mechanism 4 driven by the upper die unit 2 instantly checks the tapped hole of the workpiece, thereby increasing check efficiency.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A tapping apparatus adapted for tapping a workpiece, comprising:
    a lower die unit configured to drive the workpiece to move along a conveying direction;
    an upper die unit disposed above and movable upwardly and downwardly relative to said lower die unit;
    a tapping mechanism disposed between said lower and upper die units and adapted to be driven by said upper die unit for tapping the workpiece so that the workpiece is formed with a tapped hole; and
    a thread checking mechanism disposed between said lower and upper die units and spaced apart from said tapping mechanism along the conveying direction, said thread checking mechanism being driven by said upper die unit for checking the tapped hole of the workpiece;
    wherein the thread checking mechanism includes a thread checking drive rod driven and rotated by said upper die unit.

2. The tapping apparatus claimed in claim 1, wherein said thread checking mechanism includes a thread plug movable upwardly and downwardly relative to said lower die unit, and said thread checking drive rod being operable for driving upward and downward movements of said thread plug gauge and being adapted for checking the tapped hole of the workpiece.

3. The tapping apparatus claimed in claim 2, wherein said thread checking mechanism further includes a thread checking transmission gear fixed on said thread plug gauge, and a thread checking drive gear meshed with said thread checking transmission gear, said thread checking drive rod being operable for rotating said thread checking drive gear so as to drive upward and downward movements of said thread plug gauge.

4. The tapping apparatus claimed in claim 3, wherein said thread checking mechanism further includes an adjuster that is disposed on said thread plug gauge and that is movable upwardly and downwardly relative to said thread plug gauge, and a resilient member that is sleeved on said thread plug gauge and that has two ends respectively abutting against said adjuster and said thread checking transmission gear.

5. The tapping apparatus claimed in claim 3, wherein:
said thread checking mechanism further includes a thread checking protective casing that is disposed on said lower die unit and that accommodates said thread plug gauge, said thread checking transmission gear and said thread checking drive gear;
said upper die unit has a thread checking opening situated directly above said thread checking protective casing; and
when said upper die unit moves downwardly toward said lower die unit, said thread checking protective casing moves into said thread checking opening.

6. The tapping apparatus claimed in claim 2, wherein said thread checking mechanism further includes an insulation supporter disposed on said lower die unit and below said thread plug gauge, and a sensor connected to said insulation supporter.

7. The tapping apparatus claimed in claim 1, wherein said tapping mechanism includes a thread forming tap movable upwardly and downwardly relative to said lower die unit, and a thread forming drive rod driven and rotated by said upper die unit, said thread forming drive rod driving upward and downward movements of said thread forming tap and being adapted for tapping the workpiece.

8. The tapping apparatus claimed in claim 7, wherein said tapping mechanism further includes a thread forming transmission gear fixed on said thread forming tap, and a thread forming drive gear meshed with said thread forming transmission gear, said thread forming drive rod being operable for driving rotation of said thread forming transmission gear so as to drive upward and downward movements of said thread forming tap.

9. The tapping apparatus claimed in claim 8, wherein:
said tapping mechanism further includes a thread forming protective casing that is disposed on said lower die unit and that accommodates said thread forming tap, said thread forming transmission gear, and said thread forming drive gear;
said upper die unit has a thread forming opening situated directly above said thread forming protective casing; and
when said upper die unit moves downwardly toward said lower die unit, said thread forming protective casing moves into said thread forming opening.

10. A tapping apparatus adapted for tapping a workpiece, comprising:
a lower die unit configured for placement of the workpiece;
an upper die unit disposed above and movable upwardly and downwardly relative to said lower die unit;
a tapping mechanism disposed between said lower and upper die units and adapted to be driven by said upper die unit to move downwardly for tapping the workpiece so that the workpiece is formed with a tapped hole; and
a thread checking mechanism disposed between said lower and upper die units and including a thread plug gauge movable upwardly and downwardly, said thread plug gauge being driven by said upper die unit to move downwardly relative to said lower die unit and being adapted for checking the tapped hole of the workpiece.

11. The tapping apparatus claimed in claim 10, wherein said thread checking mechanism further includes a thread checking drive rod driven and rotated by said upper die unit, said thread checking drive rod being operable for driving upward and downward movements of said thread plug gauge and being adapted for checking the tapped hole of the workpiece.

12. The tapping apparatus claimed in claim 11, wherein said thread checking mechanism further includes a thread checking transmission gear fixed on said thread plug gauge, and a thread checking drive gear meshed with said thread checking transmission gear, said thread checking drive rod being operable for rotating said thread checking drive gear so as to drive upward and downward movements of said thread plug gauge.

13. The tapping apparatus claimed in claim 12, wherein said thread checking mechanism further includes an adjuster that is disposed on said thread plug gauge and that is movable upwardly and downwardly relative to said thread plug gauge, and a resilient member that is sleeved on said thread plug gauge and that has two ends respectively abutting against said adjuster and said thread checking transmission gear.

14. The tapping apparatus claimed in claim 12, wherein:
said thread checking mechanism further includes a thread checking protective casing that is disposed on said lower die unit and that accommodates said thread plug gauge, said thread checking transmission gear and said thread checking drive gear;
said upper die unit has a thread checking opening situated directly above said thread checking protective casing; and
when said upper die unit moves downwardly toward said lower die unit, said thread checking protective casing moves into said thread checking opening.

15. The tapping apparatus claimed in claim 10, wherein said thread checking mechanism further includes an insulation supporter disposed on said lower die unit and below said thread plug gauge, and a sensor connected to said insulation supporter.

16. The tapping apparatus claimed in claim 10, wherein said tapping mechanism includes a thread forming tap movable upwardly and downwardly relative to said lower die unit, and a thread forming drive rod driven and rotated by said upper die unit, said thread forming drive rod driving upward and downward movements of said thread forming tap and being adapted for tapping the workpiece.

17. The tapping apparatus claimed in claim 16, wherein said tapping mechanism further includes a thread forming transmission gear fixed on said thread forming tap, and a thread forming drive gear meshed with said thread forming transmission gear, said thread forming drive rod being operable for driving rotation of said thread forming transmission gear so as to drive upward and downward movements of said thread forming tap.

18. The tapping apparatus claimed in claim 17, wherein:
said tapping mechanism further includes a thread forming protective casing that is disposed on said lower die unit and that accommodates said thread forming tap, said thread forming transmission gear, and said thread forming drive gear;

said upper die unit has a thread forming opening situated directly above said thread forming protective casing; and when said upper die unit moves downwardly toward said lower die unit, said thread forming protective casing moves into said thread forming opening.

\* \* \* \* \*